Dec. 6, 1955  M. H. STANSBURY  2,725,898
PIPE GUIDE AND JOINT PROTECTOR
Filed Feb. 8, 1954
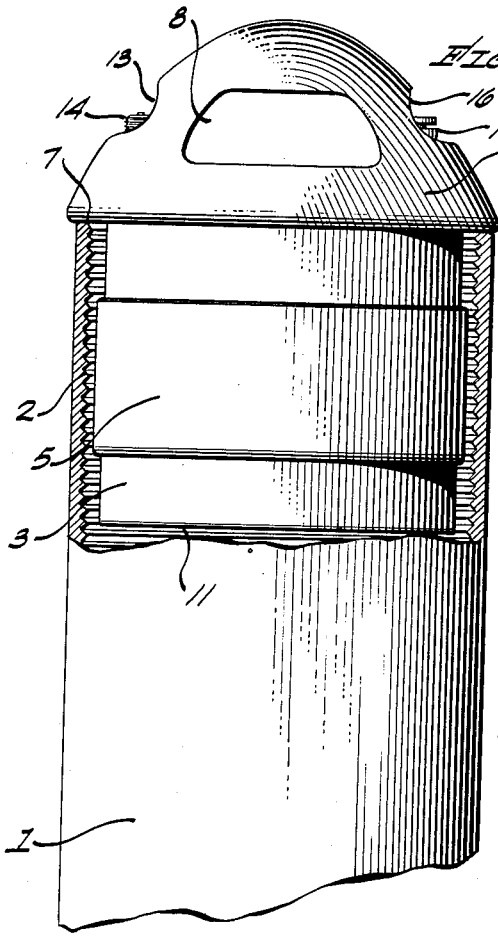
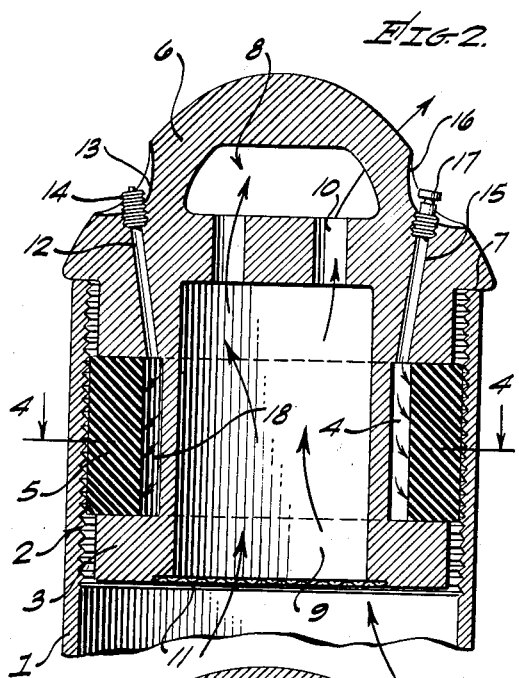
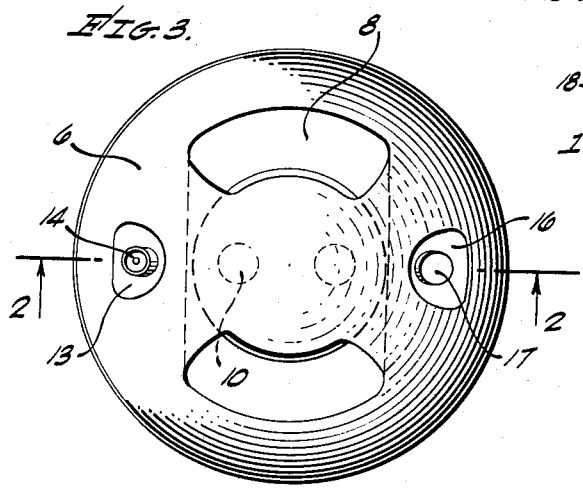
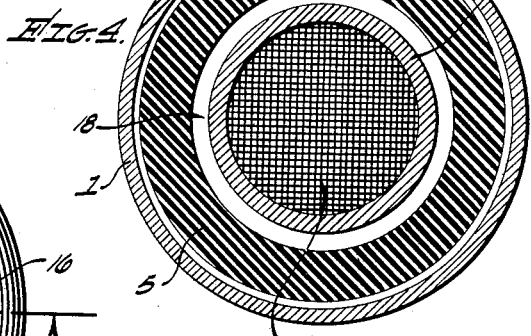
INVENTOR.
MELVIN H. STANSBURY,
BY
ATTORNEY.

United States Patent Office 2,725,898
Patented Dec. 6, 1955

2,725,898

PIPE GUIDE AND JOINT PROTECTOR

Melvin H. Stansbury, Bakersfield, Calif.

Application February 8, 1954, Serial No. 408,729

2 Claims. (Cl. 138—96)

This invention relates to a pipe guide and joint protector for pipe, and also a means of inclosing the end of the pipe for the purpose of excluding large objects.

An object of my invention is to provide a novel pipe guide and joint protector in which a movable annulus is pressed outwardly by air pressure against the inside threads of the pipe, for the purpose of holding a protector in position to not only cover the inside threads of the pipe, but also an external handle which serves to protect the end of the pipe and also exclude objects of appreciable size.

Another object of my invention is to provide a novel pipe guide and joint protector of the character stated, in which a flexible annulus or ring is mounted within a metal housing and is caused to move outwardly within this housing by air pressure to engage the inside threads of the pipe, the metal housing being of sufficient length to extend over the threads of the pipe. The metal housing being also provided with a screen to prevent objects of appreciable size from dropping into the pipe.

This invention is an improvement on an application of J. F. Northrop for Pneumatically Actuated Thread Protector, filed on the 5th day of April, 1954, Ser. No. 421,105.

Other objects, advantages and features of invention may appear from the accompanying drawing, the subjoined detailed description and the appended claims.

In the drawing

Figure 1 is a side elevation of my joint protector mounted within a pipe, the pipe being broken away to show the joint protector in position.

Figure 2 is a longitudinal sectional view of my joint protector in position within a pipe.

Figure 3 is a top plan view of my protector.

Figure 4 is a sectional view taken on line 4—4 of Figure 2.

Referring more particularly to the drawing, the pipe 1 is provided with internal threads 2, and these threads are adjacent the end of the pipe, all of which is usual and well known. These threads and the end of the pipe are the ones which are to be protected and prevented from being battered or otherwise injured when the pipe is being moved from place to place, or while the pipe is being run into a well, for example, or is being lowered into a ditch, etc. My joint protector consists of a metal housing 3 of sufficient size to fit within the pipe 2. The housing 3 is formed with an annular groove 4 which extends inwardly from the outer edge of the housing. A ring 5, preferably formed of plastic or rubber, is mounted within the groove 4 and is adapted to move outwardly and inwardly under air pressure, as will be further described.

A conical cap or handle 6 is integrally formed with the housing 3 and on the upper end thereof. A shoulder 7 on the lower end of the handle 6 bears against the end of the pipe 1, and also acts as a stop. A horizontal hole 8 extends through the handle 6 and forms a hand grip or space so that a workman may grasp the thread protector when moving it from place to place. A central bore 9 is formed in the housing 3 and extends upwardly from the bottom thereof, as shown in Figure 2. Ducts 10 extend from the bore 9 into the hand hole 8 to permit any fluid to flow out of the pipe, as for example when this device is used in an oil or water well. A screen 11 closes the bottom of the bore 9 for the purpose of excluding any objects of appreciable size which might drop through the ducts 10.

An intake port 12 is drilled in the housing 3 and extends from a recess 13 to the space back of the ring 5. An air fitting 14 screws into this bore so that air may be forced into the space back of the ring 5 to press this ring outwardly against the threads 2. An outlet bore 15 extends from the space back of the ring 5 and thence to a recess 16 in the cap portion 6. A quick acting valve 17 threads into the bore 15 for the purpose of releasing air pressure from the space 18 back of the ring 5. The natural contraction of the rubber ring 5 will release it from engagement with the threads 2 when pressure is released from the space 18. When the ring 5 is pressed outwardly under air pressure against the threads 2, the housing 3 with its cap 6 will be firmly held in the end of the pipe 1, thus protecting the threads 2 from injury and also protecting the end of the pipe from being battered, since any impact will be carried by the cap 6, which is heavy and conical in shape to deflect any objects which might strike it.

Having described my invention, I claim:

1. A pipe guide and joint protector for pipe comprising a housing adapted to partly extend within a pipe, said housing having an annular groove on the outside thereof, a non-metallic ring fitted in said groove, an air space defined by the annular groove and the inner surface of said ring, an air intake fitting extending into said space, an air release valve extending into said space, and a cap formed on one end of said housing to inclose the end of the pipe said cap being positioned on the outside of the pipe, said cap having a hand hole extending transversely therethrough, said housing having a central bore therein extending partially therethrough and open at the lower end of the housing, and a duct extending from said bore into said hand hole.

2. A pipe guide and joint protector for pipe comprising a housing adapted to partly extend within a pipe, said housing having an annular groove on the outside thereof, a non-metallic ring fitted in said groove, an air space defined by the annular groove and the inner surface of said ring, an air intake fitting extending into said space, an air release valve extending into said space, and a conical cap formed on one end of said housing to inclose the end of the pipe said cap being positioned on the outside of the pipe, a shoulder on said cap engaging the end of the pipe, said cap having a hand hole extending transversely therethrough, said housing having a central bore therein extending partially therethrough and open at the lower end of the housing, and a duct extending from said bore into said hand hole.

References Cited in the file of this patent

UNITED STATES PATENTS

| 938,793 | Schraudenback | Nov. 2, 1909 |
| 2,055,646 | Bosley | Sept. 29, 1936 |
| 2,241,526 | Rosenkranz | May 13, 1941 |
| 2,551,834 | Ferguson | May 8, 1951 |
| 2,610,651 | Hahn | Sept. 16, 1952 |

FOREIGN PATENTS

| 19,943 | Great Britain | Oct. 23, 1893 |